(12) United States Patent
Nissan et al.

(10) Patent No.: US 11,606,344 B2
(45) Date of Patent: Mar. 14, 2023

(54) SECURITY ENFORCEMENT IN A SYSTEM WITH A MULTIPLICITY OF END UNITS

(71) Applicant: OSR ENTERPRISES AG, Cham (CH)

(72) Inventors: Moshe Nissan, Ramat Gan (IL); Yehonatan Verker, Efrat (IL); Yaniv Ben-Haim, Kfar Mordechai (IL); Yoni Schiff, Yahud (IL)

(73) Assignee: OSR ENTERPRISES AG, Cham (CH)

( * ) Notice: Subject to any disclaimer, the term of this patent is extended or adjusted under 35 U.S.C. 154(b) by 559 days.

(21) Appl. No.: 16/765,866

(22) PCT Filed: May 10, 2017

(86) PCT No.: PCT/IL2017/050520
§ 371 (c)(1),
(2) Date: May 20, 2020

(87) PCT Pub. No.: WO2018/207168
PCT Pub. Date: Nov. 15, 2018

(65) Prior Publication Data
US 2020/0304482 A1 Sep. 24, 2020

(51) Int. Cl.
*H04L 9/40* (2022.01)
*B60R 16/023* (2006.01)
(Continued)

(52) U.S. Cl.
CPC .......... *H04L 63/08* (2013.01); *B60R 16/0231* (2013.01); *G06K 19/0723* (2013.01);
(Continued)

(58) Field of Classification Search
CPC ................... H04L 63/08; H04L 12/403; H04L 2012/40215; H04L 2012/40273;
(Continued)

(56) References Cited

U.S. PATENT DOCUMENTS 6,574,269 B1   6/2003   Bergamo
8,249,028 B2   8/2012   Porras
(Continued)

FOREIGN PATENT DOCUMENTS

FR    2709217 A1 *   2/1995   ............. H03H 11/30

OTHER PUBLICATIONS

ISR and IPRP for PCT/IL2017/050520.
(Continued)

*Primary Examiner* — Rownak Islam
(74) *Attorney, Agent, or Firm* — Pearl Cohen Zedek Latzer Baratz LLP (57) ABSTRACT

Method and systems for authenticating a source of a signal in a system comprising a multiplicity of electrical units. One embodiment comprises: receiving by a receiver a signal comprising a command and a characteristic added to the command; retrieving a characteristic of the signal; associating the characteristic with an alleged transmitter of the signal; determining a transmitter of the signal; decoding the command from the signal; and subject to the transmitter being the same as the alleged transmitter, and that the transmitter of the signal is authorized to send the command to the receiver, performing the command.

12 Claims, 4 Drawing Sheets

(51) Int. Cl.
  *G06K 19/07* (2006.01)
  *H04L 12/403* (2006.01)
  *H04W 12/06* (2021.01)
  *H04W 12/108* (2021.01)
  *H04L 12/40* (2006.01)

(52) U.S. Cl.
  CPC .......... *H04L 12/403* (2013.01); *H04W 12/06* (2013.01); *H04W 12/108* (2021.01); *H04L 2012/40215* (2013.01); *H04L 2012/40273* (2013.01)

(58) Field of Classification Search
  CPC .. H04L 63/126; H04W 12/06; H04W 12/108; B60R 16/0231; B60R 16/023; G06K 19/0723
  USPC ............................................................ 726/4
  See application file for complete search history.

(56) References Cited

U.S. PATENT DOCUMENTS

| | | | | |
|---|---|---|---|---|
| 2010/0123569 A1* | 5/2010 | Okada | ................. | B60C 23/0408 340/5.72 |
| 2012/0161538 A1* | 6/2012 | Kinoshita | ............... | H02J 50/12 307/104 |
| 2015/0006115 A1 | 1/2015 | Svoboda | | |
| 2015/0154432 A1* | 6/2015 | Abedi | ................. | G06K 7/10019 340/10.1 |
| 2016/0205194 A1 | 7/2016 | Kishikawa | | |
| 2017/0078884 A1 | 3/2017 | Tanabe et al. | | |

OTHER PUBLICATIONS

European Search Report for Application No. EP 17909397, dated Jun. 2, 2021.
Supplementary European Search Report for Application No. EP 18854837, dated Jul. 23, 2021.
M Johnson et al: "Semantic Photo Synthesis"; computer graphics forum, Sep. 1, 2006. Abstract available.
Pomerleau Dean A: ALVINN: An autonomous Land Vehicle in a Neural Network; Jan. 1, 1989; Carnegie Mellon University, Pittsburgh, PA, USA.
Swati Agarwal et al: Content Based Image Retrieval using Discrete Wavelet Transform and Edge Histogram Descriptor; Information Systems and Computer Networks, 2013 Conference on IEEE; Mar. 9, 2013.
Jiang Lu et al: "Zero-Shot Learning by Generating Pseudo Feature Representations" Arxiv. Org, Cornell University Ithaca, NY 14853; dated Mar. 19, 2017.

* cited by examiner

SECURITY ENFORCEMENT IN A SYSTEM WITH A MULTIPLICITY OF END UNITS

TECHNICAL FIELD

The present disclosure relates to security in general, and to protecting systems having a multiplicity of end units, such as cars, in particular.

BACKGROUND

Computerized devices and systems control almost every aspect of our life. In particular, all or almost all sub-systems in modern cars are computerized, including essential parts such as engine, gear, brakes, etc., as well as peripheral parts, such as the entertainment system, window controller, or the like.

As part of their ongoing operation, the sub-systems transmit and receive messages to and from a controller or each other.

Despite the sophistication, performance and possibilities provided by the computerized sub-systems, they also pose significant risks. The risks are similar to those any computerized systems face, but the very nature of the car makes such risks highly dangerous. For example, an attacker may install a malicious piece of software on the engine of the side mirror when the car is parked on the street. The software may attempt to send dangerous commands to other end units, to the engine controller to increase speed, to the brakes controller to stop, or the like. Additionally or alternatively, the software may assume control over the central processor of the vehicle, and may make the central processor send such incorrect and dangerous commands to the end units Thus, the car sub-systems and therefore the whole car and particularly the passengers become highly vulnerable to malicious software and even to bugs or other problems. The sensitivity of the car behavior to many of these commands, and the severity of accidents or other problems caused by such actions is enormous, therefore performing such commands should be avoided.

BRIEF SUMMARY

One exemplary embodiment of the disclosed subject matter is a method for authenticating a source of a signal in a system comprising a multiplicity of electrical units, the method comprising: receiving by a receiver a signal comprising a command and a characteristic added to the command; retrieving a characteristic of the signal; associating the characteristic with an alleged transmitter of the signal; determining a transmitter of the signal; decoding the command from the signal; and subject to the transmitter being the same as the alleged transmitter, and that the transmitter of the signal is authorized to send the command to the receiver, performing the command. Within the method, the characteristic is optionally an analog characteristic. Within the method, the characteristic optionally comprises at least one burst at a frequency associated with the transmitter, which is added to the signal. Within the method, the frequency is optionally within or close to a frequency range used by the transmitter. Within the method, the characteristic is optionally a digital characteristic. Within the method, the characteristic optionally comprises a unique key sequence, such that digital codes of any unique key sequences within the system are orthogonal to each other. Within the method, associating the characteristic with the transmitter of the signal optionally comprises performing internal multiplication of the signal with one or more unique key sequence, each unique key sequence associated with one transmitter, wherein the transmitter is associated with a unique key sequence of the at least one unique key sequences for which the internal multiplication is non-zero.

Another exemplary embodiment of the disclosed subject matter is a method for authenticating a source of a signal in a system comprising a multiplicity of electrical units, the method comprising: receiving by a receiver a signal comprising a command; retrieving a characteristic of the signal; associating the characteristic with an alleged transmitter of the signal; determining a transmitter of the signal; decoding the command from the signal; and subject to the transmitter being the same as the alleged transmitter, and that the transmitter of the signal is authorized to send the command to the receiver, performing the command. Within the method, the characteristic is optionally selected from the group consisting of: a rise time of a pulse of the signal; a fall time of a pulse of the signal; and a ripple of the signal. Within the method, the characteristic is optionally selected from the group consisting of: an average rise time of a multiplicity of clock pulses of a transmitter of the signal; an average fall time of a multiplicity of clock pulses of a transmitter of the signal; and a jitter of a multiplicity of clock pulses of a transmitter of the signal. Within the method, the alleged transmitter is optionally determined in accordance with specific bits of the signal.

Yet another exemplary embodiment of the disclosed subject matter is a method for authenticating a source of a signal in a system comprising a multiplicity of electrical units connected along an transmission line, the method comprising: receiving a transmission; pushing current along the transmission line; measuring impedance along the transmission line in response to the current; determining a transmitter by comparing the impedance to at least one stored impedance; extracting an alleged transmitter from the signal; decoding a command from the signal; and subject to the transmitter being the same as the alleged transmitter, and to the transmitter is authorized to transmit the command to the receiver, performing the command.

Yet another exemplary embodiment of the disclosed subject matter is a system comprising: a multiplicity of electrical units, each electrical unit configured to send or receive messages, wherein at least one of the electrical units comprises a processor adapted to: receive by a receiver a signal comprising a characteristic and a command; retrieve the characteristic of the signal; associate the characteristic with an alleged transmitter of the signal; determine a transmitter of the signal; decode the command from the signal; and subject to the transmitter being the same as the alleged transmitter, and that the transmitter of the signal is authorized to transmit the command to the receiver, perform the command. Within the system, the analog characteristic is optionally a parameter of a clock signal of the transmitter. Within the system, the parameter is optionally jitter of the clock signal of the transmitter. Within the system, the characteristic optionally comprises one or more bursts at a frequency associated with the transmitter, which is added to the signal. Within the system, the frequency is optionally within or close to a frequency range used by the transmitter. Within the system the characteristic optionally comprises a digital code, such that digital codes of any two transmitters within the system are orthogonal to each other. Within the system associating the characteristic with the transmitter of the signal optionally comprises performing internal multiplication of the signal with one or more digital codes each associated with one transmitter, wherein the transmitter is associated with a digital code of the at least one digital codes for which the internal multiplication is non-zero.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Modern cars comprise a multiplicity of electronic control units (ECUs), each responsible for operating a sub-system of the car in accordance with commands received, for example, from a central computer or from other sub-systems. The sub-systems may include engine, gear, brakes, ABS, lights, wipers, entertainment and others.

In some embodiments, the commands are transmitted in frequencies of 12 Kbit per second-1 Mbit per second, according to the used standard, such as ISO/DIS 11898 for high speed applications (500 kbit per second) and ISO 11519-2 [2] for lower speed applications (125 Kbit per second).

A common implementation of communication between systems in cars employs Controller Area Network (CAN) bus, which is a vehicle bus standard designed to allow microcontrollers and devices to communicate with each other in applications without a host computer. CAN bus is a message-based protocol, designed originally for multiplex electrical wiring within automobiles, but is also used in many other contexts, such as factory and plant controls, robotics, medical devices, avionics systems and other applications.

In the disclosure below, the terms "sub-system", "transmitter", "receiver", "end unit", "component" and "transmitter" are used interchangeably to indicate a sub system within a car or within another complex system, which is configured to transmit and receive commands, data or other transmission to and from other sub-systems.

One technical problem dealt with by the disclosed subject matter is the need to identify the source of each command or other transmission received by a sub-system, to ensure its authenticity and thus its validity.

The commands are generally received as digital signals, wherein some of the bits, for example the first 11 bits of the transmission are used for identification of the transmitting device. However, a malicious command may be transmitted in which the relevant bits indicate that it is transmitted by a legitimate sub-system, while the command is actually transmitted by another sub-system for which it is illegitimate to transmit such message. Thus, when the receiving sub-system receives the command and verifies the sender, the command may seem legitimate and the sub-system will perform the command, which may lead to disastrous results. This situation may occur, for example, if an attacker installs malicious software in one of the sub-systems, such as an engine of a side mirror, a door lock or a window, which may transmit commands to the brakes system, pretending to originate from the central controller by setting the first bits to indicate the central controller as the sending sub system. A side mirror is clearly not a legitimate sender of such command, therefore it is required to recognize that the command is illegitimate, such that it will not be performed.

One technical solution of the disclosed subject matter relates to identifying the true transmitter of a command, and whether the transmitter can legitimately transmit the specific command. If it is, then the command can be performed.

In some embodiments, the alleged transmitter can be retrieved from the signal, for example by analyzing the first bits of the command. The true transmitter of the command can then be determined as detailed below and compared to the alleged transmitter. If there is a discrepancy, i.e., the alleged transmitter is not the true transmitter, then although the command is transmitted by a legitimate transmitter, the command is illegitimate and should not be performed.

In some embodiments, the true transmitter can be identified from data added to the signal itself. The added data may be retrieved form the analog behavior of the signal carrying the command, or from the digital content.

Thus, in one embodiment, a specific frequency may be added to the signal, in addition to the transmission of the command itself. This frequency can be the idle frequency of the transmitter, or any other frequency within the frequency range of the transmitter, or close to that, for example up to 20% deviation from the boundaries of the frequency range of the transmitted signal.

In another embodiment, the added data may be digital, and transmitter can be identified from the signal using orthogonal key sequences, in which each transmitter encodes the transmission with a unique code, wherein codes of all transmitters are orthogonal to each other. Upon receipt of the command, the receiving sub system may perform internal multiplication of the command with each of the codes. For all transmitters but the true transmitter, this will yield a value of zero. Thus, the true transmitter of the command is the one for which the result is other than zero.

In further embodiments, the true transmitter can be recognized by the analog behavior of the received signal. In one example, the wave form of each ECU can be analyzed. The wave form characteristics, computed for example as the average characteristics measured for at least a predetermined number of pulses, may be determined and stored. Then when receiving transmission from an alleged ECU, one or more individual pulses may be analyzed, and the results may be compared to the values stored in association with the ECU. Alternatively, the wave form may be analyzed, and an ECU having matching values may be searched for within the stored values. The parameters may include but are not limited to any one or more of the following: rise time, fall time and ripple.

Additionally or alternatively, analysis of the clock pulses of the alleged ECU may be performed, and parameters thereof may be determined and stored. For example, the rise time, the fall time and the jitter over a predetermined number of clock pulses may be determined and stored. Them when receiving a transmission from an alleged ECU, a multiplicity of pulses may be analyzed, and the resulting values compared against the parameter values previously stored for the ECU. Alternatively, one or more pulses of the wave form may be analyzed, and an ECU having matching values may be searched for within the stored values.

In further embodiments, the true transmitter may be recognized by the effect of the transmission on the current within a transmission line connecting the sub-units.

One technical effect of the disclosed subject matter is the efficient detection or verification of the true transmitter of a command or instruction, and thus the legitimacy of the command.

Another technical effect of the disclosed subject matter is the detection of a false command which is not transmitted by the alleged transmitter but rather by another transmitter, and is thus suspected of being the result of an attack or a bug and can be treated accordingly.

Figure 1:
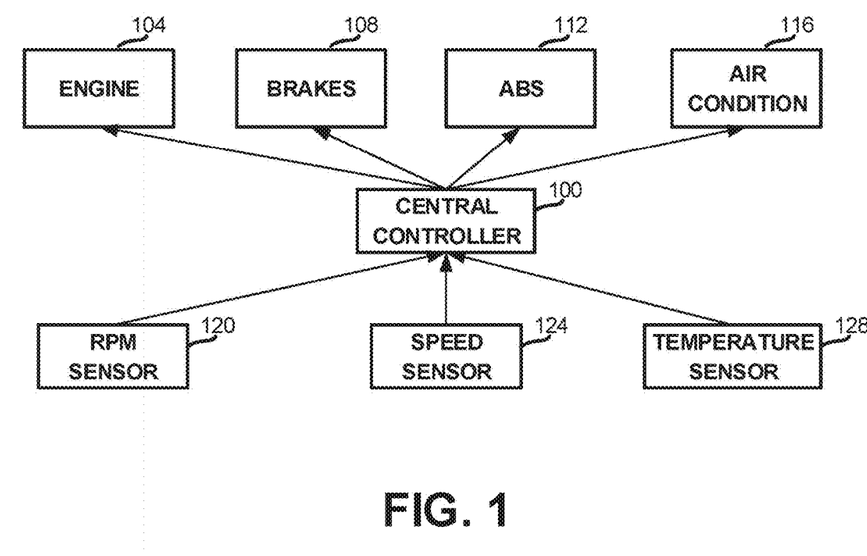
FIG. 1 is a schematic block diagram of components in a complex system such as car.

Referring now to FIG. 1, showing a schematic block diagram of components in a complex system such as car. The system may comprise one or more sensors, such as rotation per minute (RPM) sensor 120, speed sensor 124, or temperature sensor 128. It will be appreciated that these sensors are exemplary only and that multiple other sensors are used in each car, including sensors for sensing the environment, sensors of the car performance, sensors or other indicators of user activity, or the like.

The system further comprises operative sub-systems such as engine 104, brakes 108, ABS 112, and air-condition 116. It will be appreciated that these sub-systems are exemplary only and that multiple other sub-systems are used in each car, including essential sub-systems such as gear, non-essential sub-systems such as entertainment, and others.

The system further comprises central controller 100 for receiving data from the sensors and transmitting commands to the various sub-systems in accordance with the received data. For example, sensor input that relates to the user hitting the brake pedal may cause the central controller to transmit a command to the brakes to stop the car and to the engine to decrease its speed.

It will also be appreciated that some sub-systems may comprise sensors, and may thus hold bi-directional communication with central controller 100.

In order to characterize a source of a command, additional information may be embedded therein. The receiver of the signal may then analyze the signal to retrieve the information, identify the transmitting unit and compare it against the alleged sender. The additional information may be analog or digital.

Figure 2:
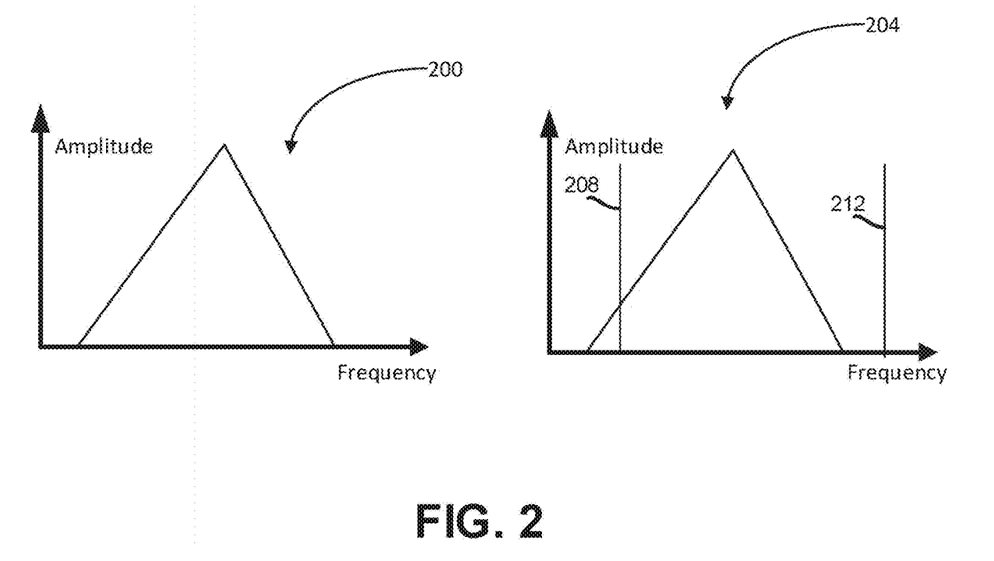
FIG. 2 is an exemplary embodiment of characterizing a command-carrying signal transmitted to a sub system, in accordance with some exemplary embodiments of the disclosed subject matter.

Referring now to FIG. 2, showing an exemplary embodiment of adding analog information for characterizing a signal carrying a transmitted command, such that a true source of the signal can be identified. Graph 200 shows the amplitude for the transmitted frequencies during ordinary transmission, without an identifying frequency. In accordance with some exemplary embodiments, and as shown in graph 204, transmission in one or more other frequencies, which are unique for the transmitter, are added. The added frequencies can be within the frequencies used by the transmitter such as frequency 208, or include frequency which is not used by the transmitter but is not too different from the used frequencies, such as frequency 212, which may be, for example, within +/−20% of the used frequencies. The added frequencies may have an amplitude substantially different from the amplitude of neighboring frequencies, such as at least double of the amplitude of neighboring frequency or.

In other alternatives, digital information can be added to the signal. For example, the signal may be encoded with one of a set of orthogonal keys, such that only by multiplying the signal with the key corresponding to the true sender the transmission can be retrieved.

Figure 3A:
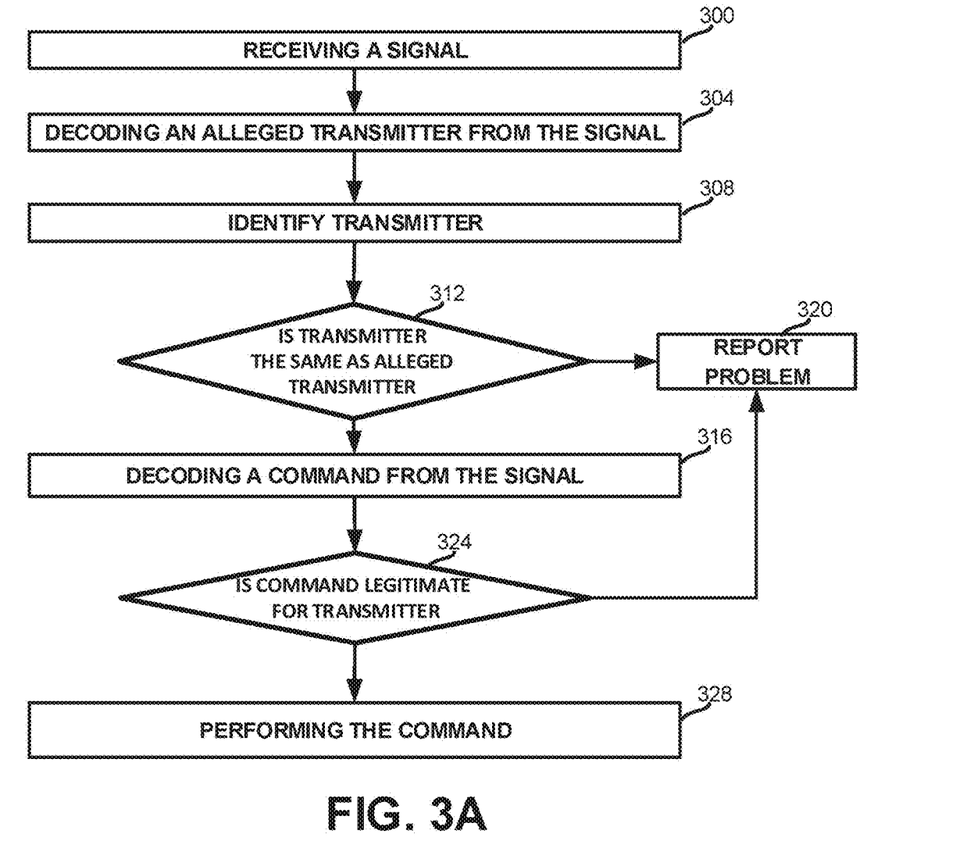
FIG. 3A is a flowchart of steps in a method for authenticating a source of a signal in a network comprising a multiplicity of sub-systems, in accordance with some exemplary embodiments of the disclosed subject matter.

Referring now to FIG. 3A, showing a flowchart of steps in a method for authenticating a source of a signal in a network comprising a multiplicity of sub-systems.

On step 300, a signal may be received by a receiver. The receiver can be any sub-system, such as the engine in a car. The signal may comprise a command, thus it is required to verify that the command is indeed transmitted by a legitimate source, otherwise executing the command may risk the system, people or property.

On step 304, the receiver can decode the alleged transmitter from the signal, for example by decoding the first 11 bits of the signal.

On step 308, a true receiver may be determined, optionally using information associated with the alleged transmitter. However, this is not always possible, as the transmission may be undecipherable before a unique code is obtained.

In an embodiment in which the transmitter adds one or more analog characteristics, such as unique frequencies to the signal, the receiver can use a look up table to determine the frequencies associated with the alleged transmitter.

In another example, when using orthogonal key sequences, the receiver can use a look up table to determine the unique code associated with the alleged transmitter. The receiver can then perform internal multiplication of the signal by the unique code.

On step 312, it may be determined whether the transmitter is indeed the same as the alleged transmitter.

In the implementation in which one or more unique frequencies are added to the signal, the receiver can determine whether the unique frequencies are indeed detected in the signal. This can be done using Fast Fourier Transform (FFT), or by using notch filters. If the unique frequencies are indeed found in the transmission, then the transmitter is assumed to be the alleged transmitter.

In the orthogonal key sequences implementation, if the product of the signal with the unique code of the alleged transmitter is non-zero, then the transmitter is assumed to be the alleged transmitter.

It will be appreciated that the identity of the transmitter can also be determined independently of determining the alleged transmitter on step 304.

Thus, when adding a unique frequency, the receiver can search for transmission in a frequency differing in amplitude from its neighboring frequencies, for example a frequency wherein frequencies in its environment, for example +/− are not used or have an amplitude which is at most 50% of the amplitude of the amplitude of the particular frequency. When the frequency is found, the transmitter associated with the frequency can be determined.

Figure 3B:
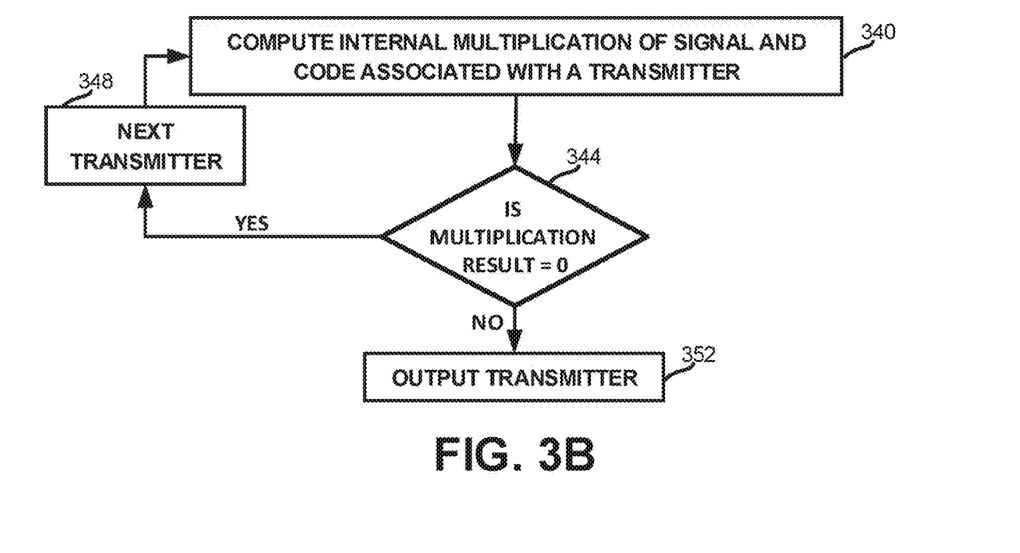
FIG. 3B is a flowchart of steps in a method for determining a transmitter of a message when using orthogonal key sequences, in accordance with some exemplary embodiments of the disclosed subject matter.

Referring now to FIG. 3B, showing a flowchart of steps in a method for determining a transmitter when using orthogonal key sequences.

On step 340, the transmitter can perform internal multiplication of the signal with a unique code associated with a specific transmitter.

On step 344, it may be verified whether the internal multiplication result is zero. If it is, then a next transmitter is determined on step 348, and execution returns to step 340 in which the code associated with of the next transmitter is tried.

If the result is non-zero then on step 352 the respective transmitter is output.

Referring now back to FIG. 3A, on step 312 it may be determined whether the transmitter is the same as the alleged transmitter.

If not, then on step 320 it may be reported that there may be a sabotage attempt, fraud or another attack attempt or problem. The report may be in any format, including displaying a message over a display device, providing a vocal alert, sending a message to a person in charge, or the like. Additional steps may be taken, such as graceful degradation of the system.

If the transmitter is the same as the alleged transmitter, then on step 316 the command may be determined from the signal, and on step 324 it may be determined whether the transmitter is authorized to transmit the specific command.

If it is, then on step 328 the command may be performed or executed, otherwise a problem may be reported on step 320 as detailed above.

It will be appreciated that step 316 of determining the command may be performed prior to step 312 of checking whether the transmitter and the alleged transmitter are the same, and that steps 312 and 324 may be performed as a combined test of whether the alleged transmitter is the same as the transmitter and whether the transmitter is authorized to transmit the command.

It will be appreciated that the steps of FIG. 3A and FIG. 3B can be performed by any sub system receiving a signal, including the central processor or any of the sub systems.

In further embodiments, the true transmitting unit can be identified on step 308 using a characteristic of the transmitted signal itself, without additional information.

Thus, single-pulse information may be analyzed and stored for each transmitter, such as rise time, fall time and ripple. Additionally, or alternatively, information relevant for multiple pulses can be analyzed and stored for the clock signal of each transmitter, such as the jitter of the signal.

The corresponding characteristics of the transmitted signal can then be determined during transmission, and compared to the characteristics of the alleged transmitter, as described above.

Figure 4:
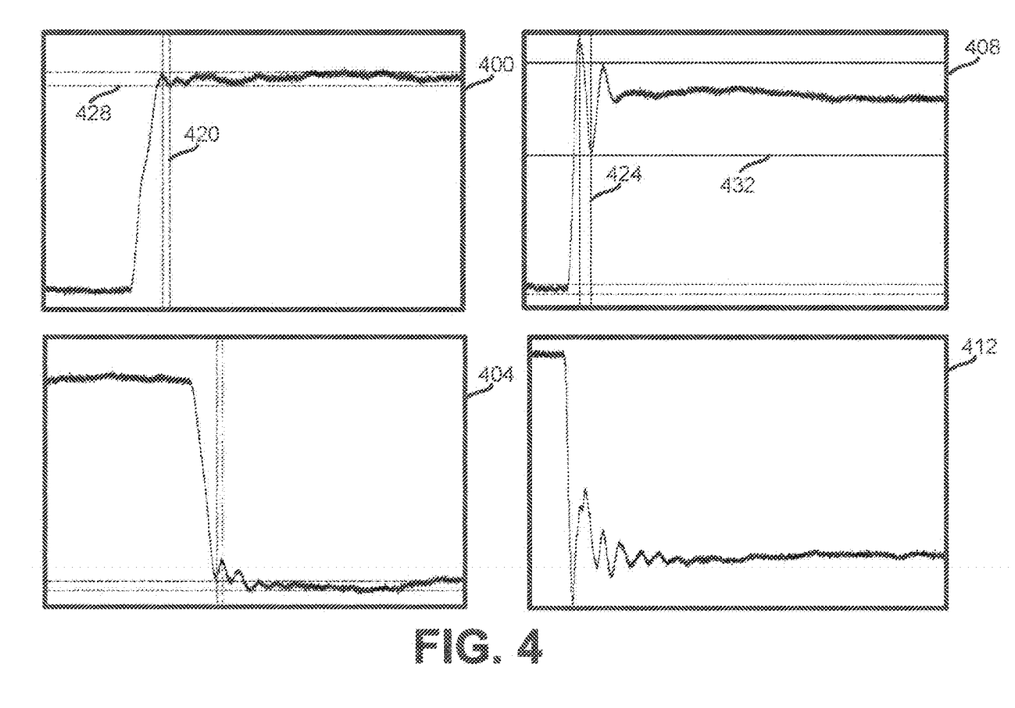
FIG. 4 shows exemplary signal having different characteristics, in accordance with some exemplary embodiments of the disclosed subject matter.

Referring now to FIG. 4, showing four exemplary waveforms, wherein graphs 400 and 404 depict the rise and fall of a pulse of a particular unit, and graphs 408 and 412 depict the rise and fall of a pulse of another unit. It is clearly seen that the bounce times 420 and 424 of the rising pulses of the first and second unit, respectively are significantly different and so are their ripple amplitudes 428 and 432. The other parameters, such as rise time or fall time are significantly different as well. Thus, a multiplicity of transceivers can be characterized and differentiated by one or more such parameters.

Figure 5:
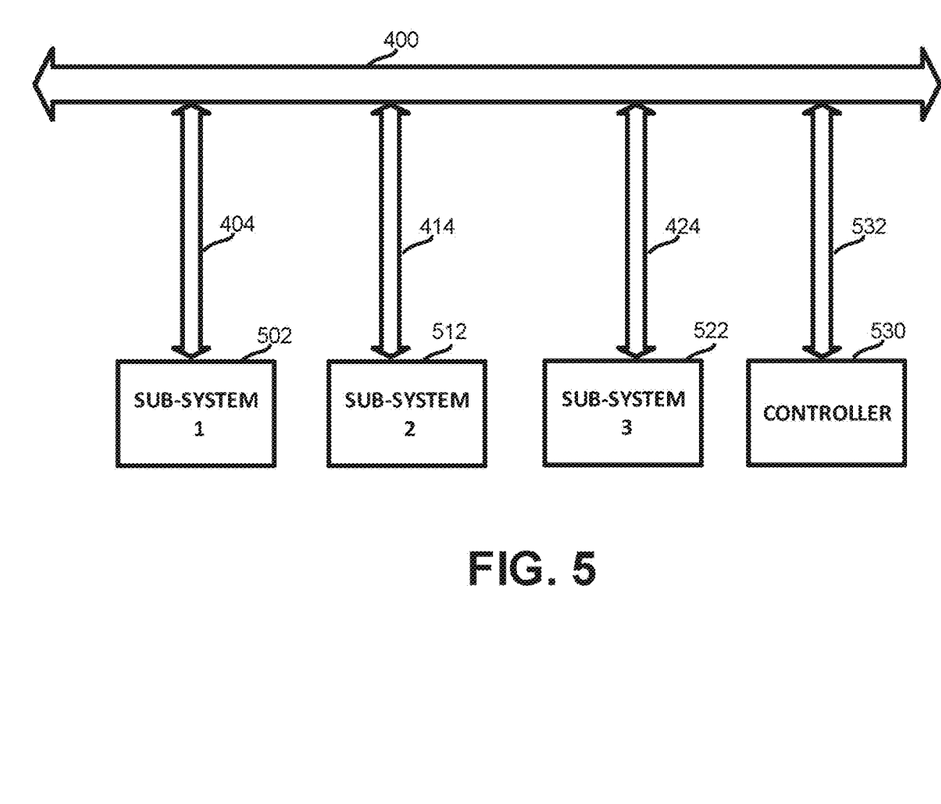
FIG. 5 shows a general structure of a system, in which a transmitting sub-system can be determined, in accordance with some exemplary embodiments of the disclosed subject matter.

Referring now to FIG. 5, showing a general structure of a system, in which a transmitting unit can be determined.

The system comprises a common transmission line 500, connecting a multiplicity of sub systems, such as sub-system 1 (502) connected to transmission line 500 via connection 504, sub-system 2 (512) connected to transmission line 500 via connection 514, and sub-system 3 (522) connected to transmission line 500 via connection 524. The system may further comprise a controller 530 connected to transmission line 400 via connection 532.

In accordance with certain communication protocols such as CAN bus discussed above, only one sub-system can transmit at any given time. When a unit is transmitting, its components are active and consume current, and the impedance over the line changes. The electrical behavior of the system can then be characterized for each transmitting unit. Since each sub system has its own unique structure, it has a different effect on the impedance along the transmission line.

Thus, on a preparatory stage, the effect of the transmission on the impedance, possibly when pushing current along the transmission line when any of the sub-systems is transmitting may be determined and mapped, and the resulting impedance associated with each sub-system may be stored.

Then when transmission is received by the controller, the controller or another unit may push current to the transmission line, and may measure the impedance along the transmission line. The resulting impedance may then be compared to the stored currents or patterns, and the transmitter may be determined. In some embodiments, the impedance associated with each transmitter may be measured (at the preparatory stage and during transmission) at a number of points along the transmission line in order to uniquely identify the transmitter. The transmitter can then be compared to the alleged transmitter which may be determined from the transmission, as described in association with FIG. 3A above.

It will be appreciated that the disclosure may refer not only to commands but also to sensor outputs. A fake sensor output, for example an engine temperature reported to be lower than it really is, may make the central controller command the engine to increase speed and thus harm it. Thus, a check related to the source of sensor readings may also be performed for verifying that the true transmitter of the report is also the alleged transmitter, and thus the reading should indeed be considered. A reading can thus be interpreted as a command instructing the receiver to determine an action to be performed in accordance with the reading. If the alleged transmitter is other than the true transmitter, than a problem may be reported as detailed above.

The disclosure thus provides for identifying a true transmitter of commands or readings, and determining whether the true transmitter is the same as an alleged transmitter, and whether the transmitter is allowed to transmit the message, thus avoiding pretending senders to transmit messages which may be dangerous. The identification and command verification are fast and efficient and can be operative in fast detection of problems before harm is done.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for authenticating a source of a signal in a system comprising a multiplicity of electrical units, the method comprising:
receiving by a receiver a signal comprising a command and a characteristic added to the command;
retrieving the characteristic of the signal;
associating the characteristic with an alleged transmitter of the signal;
determining a transmitter of the signal;
decoding the command from the signal; and
subject to the transmitter being the same as the alleged transmitter, and that the transmitter of the signal is authorized to send the command to the receiver, performing the command,
wherein the characteristic is a digital characteristic,
wherein the characteristic comprises a unique key sequence, such that digital codes of any unique key sequences within the system are orthogonal to each other, and
wherein associating the characteristic with the transmitter of the signal comprises performing internal multiplication of the signal with one or more unique key sequences, each unique key sequence associated with one transmitter, wherein the transmitter is associated with the unique key sequence of at least one unique key sequences for which the internal multiplication is non-zero.

2. The method of claim 1, wherein the characteristic comprises at least one burst at a frequency associated with the transmitter, which is added to the signal.

3. The method of claim 2, wherein the frequency is within or close to a frequency range used by the transmitter.

4. A method for authenticating a source of a signal in a system comprising a multiplicity of electrical units, the method comprising:
receiving by a receiver a signal comprising a command;
retrieving a characteristic of the signal;
associating the characteristic with an alleged transmitter of the signal;
determining a transmitter of the signal;
decoding the command from the signal; and
subject to the transmitter being the same as the alleged transmitter, and that the transmitter of the signal is authorized to send the command to the receiver, performing the command,
wherein the characteristic is selected from the group consisting of: an average rise time of a multiplicity of clock pulses of the transmitter of the signal; an average fall time of the multiplicity of clock pulses of the transmitter of the signal; and a jitter of the multiplicity of clock pulses of the transmitter of the signal.

5. The method of claim 4, wherein the characteristic is selected from the group consisting of: a rise time of a pulse of the signal; a fall time of a pulse of the signal; and a ripple of the signal.

6. The method of claim 4, wherein the alleged transmitter is determined in accordance with specific bits of the signal.

7. A method for authenticating a source of a signal in a system comprising a multiplicity of electrical units connected along a transmission line, the method comprising:
receiving a transmission;
pushing current along the transmission line;
measuring impedance along the transmission line in response to the current;
determining a transmitter by comparing the impedance to at least one stored impedance;
extracting an alleged transmitter from the signal;
decoding a command from the signal; and
subject to the transmitter being the same as the alleged transmitter, and to the transmitter is authorized to transmit the command to the receiver, performing the command.

8. A system comprising: a multiplicity of electrical units, each electrical unit configured to send or receive messages, wherein at least one of the electrical units comprises a processor adapted to:
receive by a receiver a signal comprising a characteristic and a command;
retrieve the characteristic of the signal;
associate the characteristic with an alleged transmitter of the signal;
determine a transmitter of the signal;
decode the command from the signal; and
subject to the transmitter being the same as the alleged transmitter, and that the transmitter of the signal is authorized to transmit the command to the receiver, perform the command,
wherein the characteristic is a digital characteristic,
wherein the characteristic comprises a unique key sequence, such that digital codes of any unique key sequences within the system are orthogonal to each other, and
wherein associating the characteristic with the transmitter of the signal comprises performing internal multiplication of the signal with one or more unique key sequences, each unique key sequence associated with one transmitter, wherein the transmitter is associated with the unique key sequence of at least one unique key sequences for which the internal multiplication is non-zero.

9. The system of claim 8, wherein the characteristic is an analog characteristic, and wherein the analog characteristic is a parameter of a clock signal of the transmitter.

10. The system of claim 9, wherein the parameter is jitter of the clock signal of the transmitter.

11. The system of claim 8, wherein the characteristic comprises at least one burst at a frequency associated with the transmitter, which is added to the signal.

12. The system of claim 8, wherein the characteristic comprises a digital code, such that digital codes of any two transmitters within the system are orthogonal to each other.

* * * * *